June 13, 1939.  R. R. SEARLES  2,162,034
BEARING
Filed Aug. 24, 1936
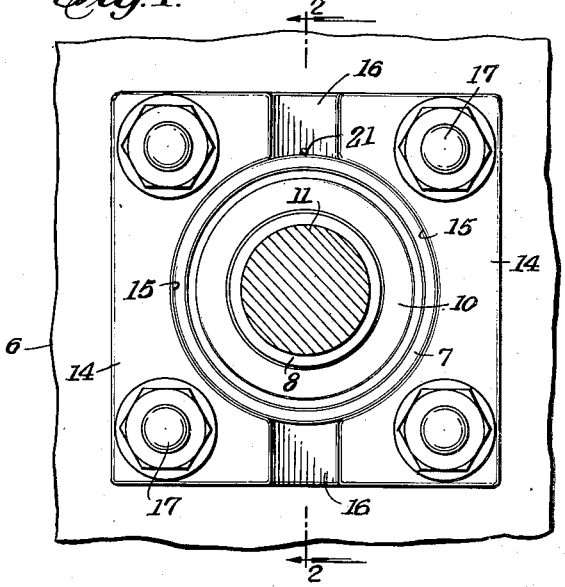
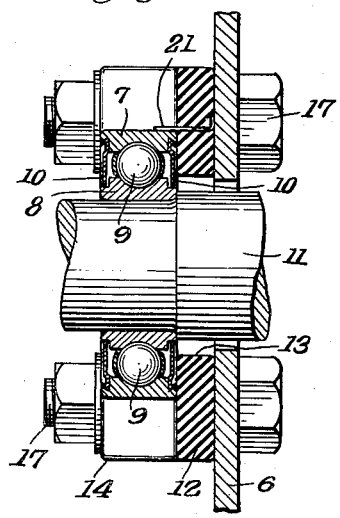
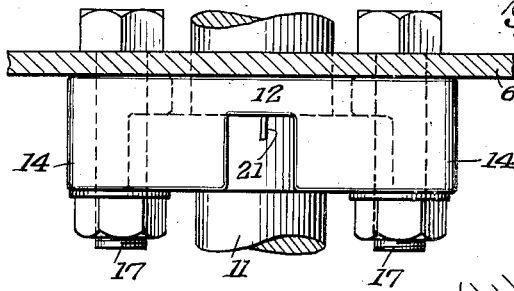
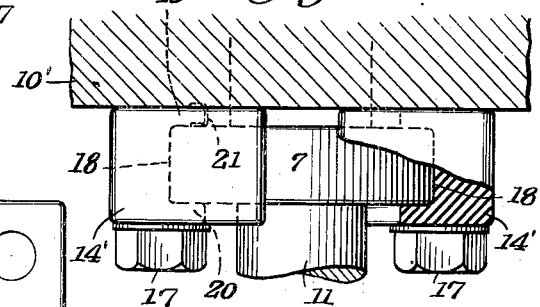
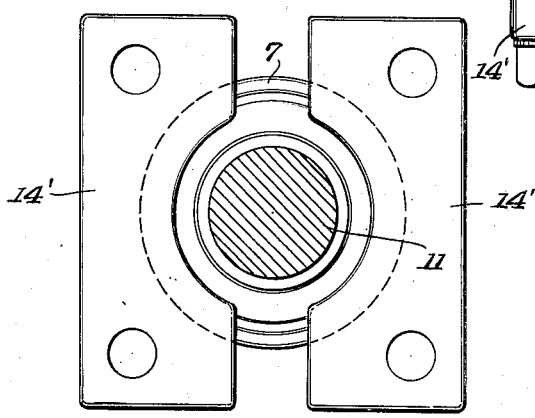
INVENTOR
RAYMOND R. SEARLES
BY
ATTORNEYS Patented June 13, 1939

2,162,034

UNITED STATES PATENT OFFICE 2,162,034

BEARING

Raymond R. Searles, New Britain, Conn., assignor to The Fafnir Bearing Company, New Britain, Conn., a corporation of Connecticut Application August 24, 1936, Serial No. 97,482

7 Claims. (Cl. 308—184)

My invention relates to a bearing and particularly to means for mounting an anti-friction bearing.

It is an object of my invention to provide a mounting for an anti-friction bearing which will to a large extent eliminate bearing noise.

It is a further object to provide a bearing housing of sound deadening material which will facilitate the assembly of the bearing with the housing.

Another object is to provide a bearing housing of sound deadening material, which is simple to manufacture, effective in use, and easy to apply.

Other objects and features of the invention will be hereinafter pointed out or will become apparent to those skilled in the art.

In the drawing which shows, for illustrative purposes only, preferred forms of the invention—

Fig. 1 is an axial view of a bearing and housing applied to a frame member or support;

Fig. 2 is a sectional view taken substantially in the plane of the line 2—2 of Fig. 1;

Fig. 3 is a top plan view of the parts shown in Fig. 1;

Fig. 4 is an axial view of a modified form of bearing support or housing, with a bearing and shaft in place;

Fig. 5 is a top plan view, partly broken away, of the parts shown in Fig. 4 applied to a frame member or support.

In said drawing, 6 indicates a supporting member, which may be a framework or other part of a machine or the like which is to support a bearing. The bearing in the preferred form shown comprises an outer bearing ring 7 and an inner bearing ring 8 with interposed anti-friction bearing members such as balls 9. The bearing is preferably sealed at opposite sides by means of seal plates 10, as will be understood. A shaft 11 is carried by the inner ring and as illustrated is shouldered so as to engage one edge of the bearing ring, and any suitable means such as a fixed collar or the like may secure the bearing against movement on the shaft in the other direction.

The housing for the bearing, in the form shown in Figs. 1 to 3, comprises a housing of sound deadening material preferably formed so as to provide a base plate and upstanding housing portions for engaging parts of the outer bearing ring. As illustrated I have provided a base plate 12 of sound deadening material, preferably rubber, to fit flatwise against the face of the frame 6, as shown particularly in Figs. 2 and 3. The base when designed for a through shaft has an axial opening or bore 13 concentric with the bearing and preferably larger than the shaft passing therethrough. A pair of bearing housings 14—14 extend up integrally from the base 12 and may be spaced apart a suitable distance as illustrated. The upstanding housing portions 14—14 are provided with complementary arcuate surfaces 15—15 to engage the outer bearing ring circumferentially and hold the same in place. As shown in Fig. 2 the outer bearing ring is designed to be forced into the housing until the edge of the ring engages the base plate 12 at the bottom of the arcuate recess. In the form shown in Figs. 1 to 3, the outer end of the housing is open, while in the forms shown in Figs. 4 and 5 there is provided an outer flange or lip so that the outer ring is supported axially by the housing in both directions. With the illustrations of Figs. 4 and 5 it will be clear that such a lip or flange could be provided in the form shown in Figs. 1 to 3, if desired.

In order to assemble the bearing with the housing the two housing members 14—14 may be moved relatively to each other by bending the base plate at the connecting portions 16—16, which movement will of course have the effect of separating the housing portions and radially enlarging the opening formed by the arcuate supporting surfaces 15—15. When the bearing is slipped into place, the housing portions 14—14 are either moved back or spring back to normal positions so as to securely hold the bearing. When the bearing has been assembled with the housing, the latter is applied to the support 6 and may be secured thereto as by means of the bolts 17—17, two bolts preferably being provided for each housing part 14. These bolts, as illustrated, extend in a direction axially of the bearing and are sufficiently spaced from the bearing supporting portions so that the liveness and resiliency and sound deadening properties of the rubber at the bearing supporting parts are affected little or none.

Whether the shaft is shouldered or whether a collar or a press fit of the inner ring on the shaft is employed, it will be clear that when two bearing housings of the character illustrated are used on the shaft, the bearings may be secured on the shaft so as to slightly compress the rubber base 12 and thus always keep the bearings under some thrust or angular contact load. It is therefore unnecessary to provide for a fixed and floating bearing, since the shaft will be held with considerable firmness against any axial movement by merely properly placing the bearings so as to maintain them under slight load and the resiliency of the rubber will take care of all axial movement due to shaft expansion and contraction.

In the form shown in Figs. 4 and 5 all parts are substantially the same as those heretofore described, except that the two housing parts 14'—14' are entirely separate from each other; that is to say, there is no base plate or connecting web like the web 16 shown in Figs. 1 to 3. In the form shown in Figs. 4 and 5, the housing members 14'—14' are provided with channel shaped arcuate bearing receiving recesses 18—18 so that the outer bearing ring 7 may abut axially the inturned flange 19 in the same manner that the corresponding part of the base 12 was engaged by the outer ring in the form shown in Figs. 1 to 3. In addition to the inner flange 19, there may be an outer flange 20 so that when the two housing parts are assembled with the bearing the latter is held against displacement in all directions. The function and operation of the forms shown in Figs. 4 and 5 is substantially the same as that heretofore described.

In order to prevent the accumulation of static charges on the shaft or parts carried thereby, I have provided means for grounding the insulated parts. In the form shown a conducting member, which may be a strip of metal 21, extends through the rubber plate 12 and engages both the metallic supporting member 6 and the outer ring 7. In the form shown in Figs. 4 and 5, the grounding connection comprises a conducting strip wrapped about the edge of the inner flange 19 and which engages the outer ring of the bearing as well as the metallic housing or support 10'.

While I have disclosed herein an improved form of housing for a bearing which will serve to very substantially eliminate or deaden the bearing noises, it is to be understood that further sound deadening may be required, in which case the inner ring 8 may also be separated from the shaft by means of sound deadening material, for example as disclosed in my application, Serial No. 97,481, filed Aug. 24, 1936.

While the invention has been described in considerable detail, it is to be understood that various changes may be made within the scope of the invention and as defined in the appended claims.

I claim:

1. In a device of the character indicated, a pair of housing blocks formed of sound deadening material, each block having an arcuately formed surface for engaging a bearing held between said blocks, a flexible base member connecting said housings, and means for securing all of said parts to a support.

2. In a device of the character indicated, a flexible base member, a pair of integral housing members on said base and projecting transversely therefrom, each of said housing members having an arcuately formed seating surface for a bearing, for the purpose described.

3. In a device of the character indicated, a base member of sound deadening material to be engaged by one edge face of a bearing, said base member having a pair of upstanding housing members thereon, said housing members having arcuately formed surfaces for engaging a bearing circumferentially, for the purpose described.

4. In a device of the character indicated, a rubber base member to fit against a support, a pair of upstanding housing blocks integral with said base member, said housing blocks having arcuately formed surfaces for circumferentially engaging a bearing, said base member having a surface for engaging the bearing axially, and means for securing all of said parts to a support.

5. In a device of the character indicated, a rubber base plate to be secured to a support and having an axial opening therethrough, a pair of upstanding integral housing portions on said base member and having arcuately formed surfaces for engaging the outer bearing ring of an anti-friction bearing circumferentially, an inner bearing ring, and anti-friction bearing members interposed between said bearing rings, the bore through said inner bearing ring being smaller than the axial opening through said base plate.

6. In a device of the character indicated, a pair of opposed blocks of rubber, independent means for securing said blocks to a support, each of said blocks having a generally semi-circular channel therein to form together a generally circular channel recess, an anti-friction bearing including outer and inner bearing rings with interposed anti-friction bearing members, said outer ring being mounted in said generally circular channel recess.

7. In a device of the character indicated, a pair of opposed blocks of rubber, each of said blocks having a generally semi-circular channel therein to form together a generally circular recess, an anti-friction bearing including outer and inner bearing rings with interposed anti-friction bearing members, said outer ring being mounted in said generally circular recess, and independent means extending in a direction axially of said bearing for securing said blocks of rubber to a support.

RAYMOND R. SEARLES.